Patented Jan. 17, 1933

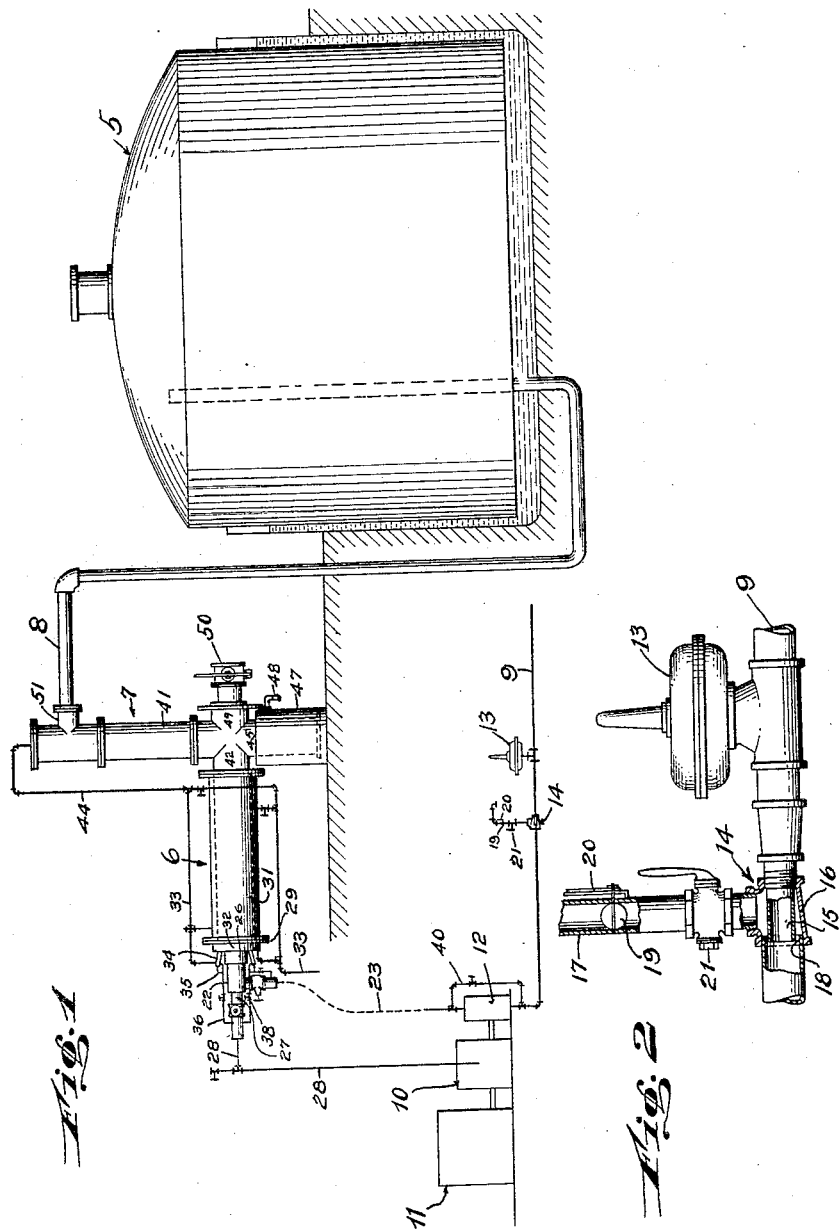

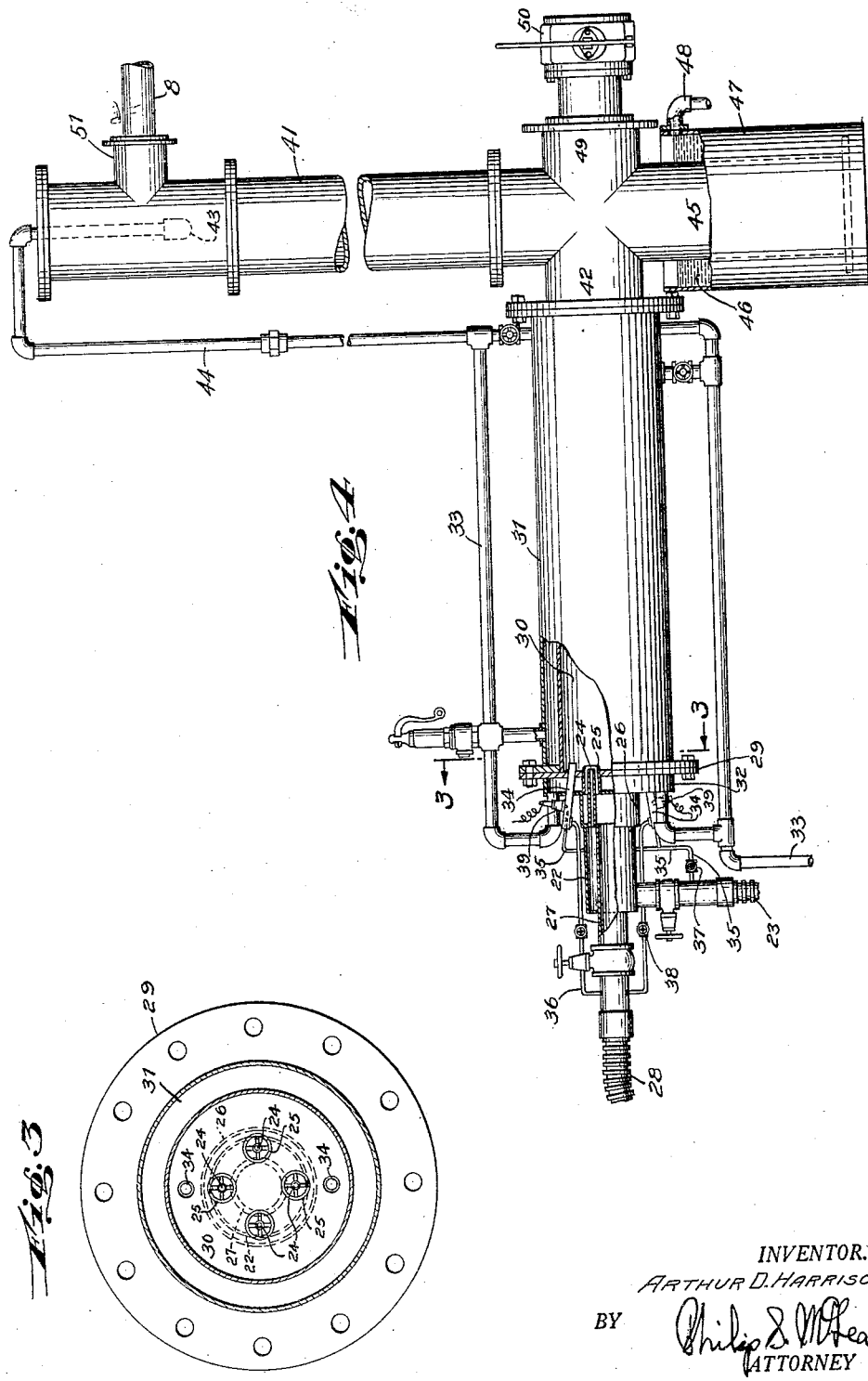

1,894,766

UNITED STATES PATENT OFFICE

ARTHUR DUDLEY HARRISON, OF BROOKLYN, NEW YORK

INERT GAS PRODUCTION

Application filed August 29, 1931. Serial No. 560,070.

This invention relates particularly to the production of inert gas, such as carbon dioxide and to the utilization of the same for "purging" gas holders and for other industrial purposes.

Special objects of the invention are to provide simple, practical and efficient apparatus for safely and continuously manufacturing inert gas of uniform quality and under sufficient pressure to serve various uses.

The novel features of construction, combinations and relations of parts by which the foregoing and other desirable objects are attained are set forth in the following specification.

The drawings accompanying and forming part of the specification illustrate one of the commercial embodiments of the invention as actually employed for purging gas holders, but it is to be understood that the structure may be modified and the invention be put to other different uses, all within the true spirit and broad scope of the invention.

Fig. 1 is a side elevation of a form of the apparatus, as employed for purging a gas holder; Fig. 2 is a broken and part sectional view illustrating the air injector and pressure governor located in the gas line; Fig. 3 is a part sectional detail view of the burner head as viewed on the plane of line 3—3 of Fig. 4; Fig. 4 is a broken and part sectional side elevation of the burner or generator structure.

In Fig. 1, the apparatus is shown set up for purging a gas holder indicated generally at 5. The generator or gas producer comprises in substance a pressure burner indicated generally at 6 and discharging inert gas through a cooler or water tower 7, into a line 8, entered into the bell of the holder.

The fuel for the burner is supplied through a gas line 9 and the main supply of air for combustion is furnished by a suitable blower or pump 10, operated by a gas engine or other suitable power device 11. The gas is put under pressure by a blower 12, which is shown as driven by the same motor, 11.

To secure uniformity regardless of changes in specific gravity of the gas, a governor 13 is preferably interposed in the gas line before it reaches the blower or booster to reduce the gas to substantially atmospheric pressure and a quantity of air is taken in by an injector 14, located in this gas line.

A suitable form of construction for the injector is illustrated in Fig. 2, where a nozzle 15 is shown provided in the gas line, between the governor and booster, surrounded by an injection chamber 16 and provided with an air intake pipe 17, the forward end of such chamber being coupled in the continuation of the gas line in a manner to provide the annular aspirating channel 18 about the end of the nozzle.

The amount of air injected in the gas line is controlled in the illustration by a butterfly valve 19 in the air intake pipe, which can be set by an external handle 20. In order that the air induction pipe may be closed off when the apparatus is not in service, a stop cock 21 is shown provided in this pipe, preferably close to the injector nozzle.

The burner portion of the apparatus is illustrated in Figs. 3 and 4, as made up of a manifold chamber 22, connected with the mixed gas and air line 23 from the booster 12 and carrying at the front end of the same the discharge pipes 24, surrounded by the air pipes 25, connected with manifold 26, which latter has an air supply pipe 27, extending back through the gas manifold and coupled up with the compressed air line 28, extending from booster 10.

The compressed gas and air mixture from booster 12, issuing from tubes 24, is thus combined and burned with the surrounding envelopes of air issuing from the annular throats provided by the surrounding tubes 25. Any number of these individual burner units may be provided, four of the same being shown in the illustration discharging through an end head 29, into one end of combustion chamber 30. This combustion chamber is shown as water-jacketed at 31 and similarly the end plate or head 29 of the burner is shown as water-jacketed at 32.

Piping 33 is shown provided for supplying cooling water to the water jackets of the burner structure and it should be noted that the outer tubes of the burner units extend through the end water jacket 32, to directly cool such units.

For ignition purposes, one or more pilot tubes 34 may be extended in through the burner head adjacent the ends of the burner units, these pilot burners being shown as supplied with gas and air by connections 35, 36, lead back to the gas and air supply lines 23, 28, and valved at 37, 38, to enable regulation of the same. Spark plugs 39 are indicated for setting off these pilot burners.

The air and gas compressors 10 and 12 are proportioned and operated to supply the desired combustible mixture to the burner units and preferably the rotors of these two blowers are of equal diameter, so that, slippage considered, with variations in speed, there will be no appreciable variations in the proportions of the mixture. The amount of air inducted with the gas is governed by the injector valve 19, to lean down the gas and effect a premixing of air and gas ready to form a combustible mixture when joined with the greater quantity of air furnished by the other booster or blower 10. With this arrangement, variations in specific gravity of the gas do not appreciably affect the proportions of the mixture at the burner head. A valved bypass is indicated at 40, Fig. 1, about the gas booster for use when it may be desirable, as when starting, or to pass gas direct to the burner without the pressure of the gas booster.

The burned gases or so-called "inerts" are exhausted under pressure from the combustion chamber into a cooler consisting in the illustration of a stand pipe or tower 41, communicating with the discharge end of the combustion chamber by a branch 42, said tower having a spray nozzle 43 in the head of the same supplied with water in the illustration by piping 44, from the water-jacket system.

For sealing and relief purposes, the cooling tower or column is shown as having a lower extension 45, dipping into a water seal 46, provided by the tub or tank 47, surrounding this lower extension. The cooling water falling down through the tower provides a continuous supply for this water seal and a drain 48 may be provided for carrying off any excess water.

A third branch 49 of the cooling column is illustrated directly opposite and in line with the branch 42, which is bolted to the end of the combustion chamber and this is shown equipped with a quick opening gate valve 50 for use in starting the burner or for flame inspection or emergency purposes.

The pressure inerts pass from the top of the cooling tower in the illustration out through a neck 51, which may be connected as here shown with piping 8, leading to the gas holder or other apparatus.

By the special new combination of air injection in the gas line, compression of such mixed gas and air and the separate compression of the main air supply, with complete mixture and combustion under pressure at the burner, a continuous volume of inert gas of substantially uniform proportions and under sufficient pressure to serve various desired purposes is produced relatively inexpensively and with relatively simple apparatus.

This apparatus may be combined in readily portable form. The system is entirely safe to operate, the inerts being sufficiently cooled immediately upon leaving the burner, to pass directly into the transfer line and the water seal serving constantly as a safety valve for any back pressure or unusual explosive effects. The compressors or boosters are preferably of a type displacing a constant quantity of gas per revolution, preferably also of the same impeller diameters, so that "slippage" will not vary disproportionately with changes in pressure and are proportioned as to capacity, so that the gas booster handles somewhat more gas than is required for complete combustion with the quantity of air handled by the air booster, the mixture being made correct by inspirating air in the gas line leading to the booster. As an alternative, it is possible that the air booster be of slightly larger capacity than required to supply the amount of air necessary for complete combustion with the quantity of gas supplied by the gas booster and the mixture be then made correct by inspirating the necessary extra quantity of gas, in the line leading to the air booster, or a combination of both these methods may be employed. In any event, the full quantity of air and gas handled by the boosters is sent to the burners, none of this being bypassed. Instead of separately piping the air and gas, or combinations of air and gas to the burner, the same may be further mixed and piped as a more nearly combustible mixture to the burner. The cooling water is fully used both for keeping the burner and cooling tower at proper operating temperatures and as a safety seal. The quick opening valve enables ready inspection of the flame at any time and permits the burner to be lighted without danger of back-fire. The machine is not affected by back pressure on the flame and variations in specific gravity and back pressure do not affect the operation of the machine. The main adjustment is the butterfly valve on the gas injector and this adjustment is not critical. The main mixing being accomplished by the use of boosters handling definite volumes of air or gas per revolution, changes in specific gravity do not have any effect on the basic mixture. By proper proportioning of the booster sizes and the air or gas injected, a uniform product or mixture can be produced, regardless of changes in specific gravity or back pressure. With this apparatus, no explosive mixtures need be piped. In addition to the uses for purging gas holders, gas lines, etc., the inerts may be employed in ovens having indirect heating pipes, etc.

The invention it will be realized, is of broad application and susceptible of many modifications, so it should be understood that the terms employed herein have been used in a descriptive, rather than in a limiting sense, except for limitations such as may possibly be imposed by the state of the prior art.

What is claimed is:

1. In apparatus of the character disclosed, the combination of separate boosters for air and gas and proportioned one to supply a greater volume than required for desirable mixture with the volume supplied by the other, an injector associated with said excess volume booster for restoring the proportions to those desired, a completely enclosed burner operating on the mixture supplied by the air and gas boosters for furnishing a substantially uniform supply of inert gas under practically constant pressure and a water cooling system for said burner including a cooler for the inert gas discharged by the burner.

2. In apparatus of the character disclosed, the combination of separate boosters for air and gas and proportioned one to supply a greater volume than required for desirable mixture with the volume supplied by the other, an injector associated with said excess volume booster for restoring the proportions to those desired, a completely enclosed burner operating on the mixture supplied by the air and gas boosters for furnishing a substantially uniform supply of inert gas under practically constant pressure, a water cooling system for said burner including a cooler for the inert gas discharged by the burner and a water seal associated with said cooler and providing a back pressure and explosion relief for the burner.

3. In apparatus of the character disclosed, the combination of a burner having a combustion chamber, connections to said combustion chamber for supplying combustible, a cooling tower directly connected with the discharge end of said combustion chamber, said combustion chamber being disposed substantially horizontally, the cooling tower being arranged substantially vertically at the discharge end of the combustion chamber and having a lateral branch directly opening to the combustion chamber, said tower structure having a quick opening valve directly opposite the connection with the combustion chamber and having further a dependent extension provided with a water seal.

4. In apparatus of the character disclosed, the combination of a burner having a combustion chamber, connections to said combustion chamber for supplying combustible and a cooling tower directly connected with the discharge end of said combustion chamber, said combustion chamber being disposed substantially horizontally, the cooling tower being arranged substantially vertically at the discharge end of the combustion chamber and having a lateral branch directly opening to the combustion chamber, said tower structure having a quick opening valve directly opposite the connection with the combustion chamber and a dependent extension in connection with the cooling tower and provided with a water seal.

5. In apparatus of the character disclosed, a burner having an enclosed combustion chamber, said combustion chamber being jacketed, a cooling tower directly connected with the end of said combustion chamber, a water seal for said cooling tower and water supply connections from the water jacket of the burner to the cooling tower and including a spray head in the cooling tower discharging into the water seal aforesaid.

6. In apparatus of the character disclosed, the combination of gas and air boosters of the positive displacement type and having impellers of substantially the same diameter, whereby slippage in the two boosters will not vary disproportionately with changes in pressure and variations in the specific gravity of the gas, the gas booster having a capacity for handling more gas than is required for complete combustion when mixed with the quantity of air handled by the air booster, a burner, an air connection from the air booster to the burner, gas connections to the gas booster and from said gas booster to the burner, air injecting means associated with said gas connections and means for controlling said air injecting means to admit a quantity of air for mixture with the gas sufficient to enable complete combustion at the burner.

7. In apparatus of the character disclosed, the combination of gas and air boosters of the positive displacement type and having impellers of substantially the same diameter, whereby slippage in the two boosters will not vary disproportionately with changes in pressure and variations in the specific gravity of the gas, the gas booster having a capacity for handling more gas than is required for complete combustion when mixed with the quantity of air handled by the air booster, a burner, an air connection from the air booster to the burner, gas connections to the gas booster and from said gas booster to the burner, air injecting means associated with said gas connections, means for controlling said air injecting means to admit a quantity of air for mixture with the gas sufficient to enable complete combustion at the burner and a shut-off valve for closing off said air injecting means from the gas connections aforesaid.

8. In combination, air and gas boosters of the positive displacement type and having impellers of substantially the same diameter, one of said boosters having a capacity for supplying a greater volume than required for proper mixture with the volume supplied by the other booster, a burner connected with said boosters and controllable means for supplying to the connections of the booster of excess capacity, a variable amount of the medium handled by the other booster sufficient to correct the final proportions at the burner.

9. The herein disclosed process of producing inert gas of substantially uniform quantity at substantially constant pressure which comprises separately compressing independent supplies of gas and air and a greater volume of the gas than required for combustion in admixture with the volume of air so compressed and bringing the volumes to correct proportions for combustion by inducing a limited amount of free air in the gas being compressed and mixing and burning said separately compressed supplies.

10. In apparatus of the character disclosed, the combination of separate boosters for air and gas and proportioned one to supply a greater volume than required for desirable mixture with the volume supplied by the other, an injector associated with said excess volume booster for injecting a quantity of the material handled by the other booster sufficient to restore the proportions to those desired, a completely enclosed burner operating on the mixture supplied by the air and gas boosters for furnishing a substantially uniform gas under practically constant pressure and cooling and explosion relief means associated with said enclosed burner.

11. In apparatus of the character disclosed, the combination of separate boosters for air and gas, an injector connected with the booster of one of said materials for taking in a limited amount of the other material, a completely enclosed burner operating on the thus compounded mixture supplied by the air and gas boosters for furnishing a substantially uniform supply of inert gas under practically constant pressure and a water cooling system for said burner including a cooler for the inert gas discharged by the burner.

12. In apparatus of the character disclosed, the combination of a generally horizontal combustion chamber, a burner sealed to one end of said combustion chamber, a cooling tower rising from and sealed to the opposite end portion of said combustion chamber and directly communicating with the interior of said combustion chamber and positioned to directly receive the inert gas rising from said combustion chamber, transfer pipe connections extending from the head of said cooling tower, means for supplying combustible under pressure to the burner and spray connections in the head of the cooling tower directly acting upon the inert gas rising from the combustion chamber, whereby a supply of inert gas under pressure cooled for immediate use and without admixture of air may be continuously supplied by said apparatus through said transfer pipe connections.

13. In apparatus of the character disclosed, the combination of a generally horizontal combustion chamber, a burner sealed to one end of said combustion chamber, a cooling tower sealed to the opposite end portion of said combustion chamber and in communication therewith, transfer pipe connections extending from the head of said cooling tower, means for supplying combustible under pressure to the burner and spray connections in the head of the cooling tower, whereby a supply of inert gas under pressure cooled for immediate use and without admixture of air may be continuously supplied by said apparatus through said transfer pipe connections, the combustion chamber having a water jacket and said water jacket being connected with the spray connections of the cooling tower and whereby the cooling water is utilized for keeping the burner and cooling tower at proper operating temperatures.

14. In apparatus of the character disclosed, the combination of a combustion chamber, a burner sealed to and discharging into one end of said chamber, a quick-opening gate valve for sealing the opposite end of said combustion chamber, a cooling tower in communication with said latter end portion of the combustion chamber, means for supplying combustible under pressure to said burner and a transfer line for carrying off the cooled inert gas from the top of the cooling tower.

15. In apparatus of the character disclosed, the combination of a water jacketed combustion chamber, a burner discharging into said combustion chamber, a cooling tower connected with said combustion chamber and having an outlet at the head of the same for the gases of combustion, a well at the foot of the cooling tower in communication with the combustion chamber, water supply connections to the water jacket of the combustion chamber and to the cooling tower and a water relief connection from the well at the foot of the cooling tower.

16. In apparatus of the character disclosed, the combination of a water jacketed combustion chamber, a water jacketed burner discharging into said combustion chamber, a cooling tower connected with the combustion chamber and provided with a spray head and an outlet for the gases of combustion and interconnected water supply connections to the water jacketed burner, and combustion chamber and spray head of the cooling tower aforesaid.

17. In apparatus of the character disclosed, the combination of an enclosed burner, a cooling tower connected with said enclosed burner and provided with a discharge outlet for the gases of combustion and cooling water connections for said enclosed burner and cooling tower including a water seal subjected to the pressure of the discharge gases and forming an explosion relief for the burner.

18. In apparatus of the character disclosed, the combination of a combustion chamber, a burner discharging into one end of said combustion chamber, a quick opening gate valve for sealing the opposite end of said combustion chamber, a cooling tower in communication with said latter end portion of the combustion chamber and provided with an outlet for the gases of combustion and water circulating connections to said combustion chamber and cooling tower.

19. In apparatus of the character disclosed, the combination of an enclosed burner, a cooling tower connected with the burner enclosure and provided with outlet connections for the gases of combustion, an explosion relief in communication with the burner enclosure and a quick opening valve in communication with the burner enclosure for relieving the latter independently of the explosion relief and the outlet for the burned gases.

In testimony whereof I affix my signature.

ARTHUR DUDLEY HARRISON.